United States Patent
Levchik et al.

(10) Patent No.: US 8,003,722 B2
(45) Date of Patent: Aug. 23, 2011

(54) FLAME RETARDANT COMPOSITIONS CONTAINING MIXTURES OF DISUBSTITUTED PHOSPHINATE SALTS AND MONOSUBSTITUTED PHOSHINATE SALTS

(75) Inventors: Sergei Levchik, Croton-On-Hudson, NY (US); Qiang Yao, League City, TX (US); Gerald R. Alessio, Emerson, NJ (US)

(73) Assignee: ICL-IP America Inc., Ardsley, NY (US)

( * ) Notice: Subject to any disclaimer, the term of this patent is extended or adjusted under 35 U.S.C. 154(b) by 0 days.

(21) Appl. No.: 12/085,727

(22) PCT Filed: Nov. 29, 2006

(86) PCT No.: PCT/US2006/045770
§ 371 (c)(1),
(2), (4) Date: Oct. 19, 2009

(87) PCT Pub. No.: WO2007/064748
PCT Pub. Date: Jun. 7, 2007

(65) Prior Publication Data
US 2010/0076132 A1 Mar. 25, 2010

(51) Int. Cl.
*C08K 5/5313* (2006.01)

(52) U.S. Cl. .................................. 524/126; 524/133

(58) Field of Classification Search .................. 524/126, 524/133
See application file for complete search history.

(56) References Cited

U.S. PATENT DOCUMENTS

| | | | | |
|---|---|---|---|---|
| 4,049,612 | A * | 9/1977 | Sandler | 524/126 |
| 5,302,645 | A * | 4/1994 | Nakano et al. | 524/120 |
| 5,780,534 | A | 7/1998 | Kleiner et al. | |
| 5,891,226 | A | 4/1999 | Kleiner et al. | |
| 6,503,969 | B1 | 1/2003 | Klatt et al. | |
| 6,534,673 | B1 | 3/2003 | Weferling et al. | |
| 6,716,899 | B1 | 4/2004 | Klatt et al. | |
| 2009/0234051 | A1 | 9/2009 | Endtner et al. | |

FOREIGN PATENT DOCUMENTS

| | | |
|---|---|---|
| DE | 3616168 | 11/1987 |
| DE | 19851730 | 9/1999 |
| EP | 0699708 | 3/1996 |
| WO | 2004/090036 | 10/2004 |
| WO | 2006/009983 | 1/2006 |

* cited by examiner

Primary Examiner — Peter Szekely
(74) Attorney, Agent, or Firm — Dilworth & Barrese, LLP.

(57) ABSTRACT

A flame retarded thermoplastic polymer composition comprising a thermoplastic polymer and a mixture of metal salts of dialkylphosphinic and monoalkylphosphinic acid providing improved flame retardant performance and better processability compared to a similar composition containing only a salt of dialkylphosphinic acid.

18 Claims, No Drawings

FLAME RETARDANT COMPOSITIONS CONTAINING MIXTURES OF DISUBSTITUTED PHOSPHINATE SALTS AND MONOSUBSTITUTED PHOSHINATE SALTS

FIELD OF THE INVENTION

This invention relates to highly efficient phosphorous-containing flame retardant compositions comprising mixtures of both mono and disubstituted phosphinic acid salts and their use in thermoplastic polymers, such as, in polyester and nylon materials.

BACKGROUND OF THE INVENTION

The flame retardant performance of polyesters or nylons can be achieved by the incorporation of various types of additives. Typically, halogenated compounds, more specifically, aromatic polybrominated compounds, have been used as flame retardant additives in such polymers. It is generally accepted that these products inhibit radical gas phase reactions from occurring in the flame when these products are ignited. This makes halogenated flame retardants very commonly used additives for different types of polymeric materials including polyesters and nylons. However, during the last fifteen years or so, halogenated flame retardants have come under scrutiny because of ecological concerns. At this time, the flame retardant industry is under pressure to change to flame retardant additives that are perceived to be more environmentally friendly.

Phosphorus-containing products are logical substitutes for such halogenated flame retardants. In some applications, phosphorus-containing additives show as high an activity as the halogenated ones, but the phosphorus-containing additives are less commonly employed. Most of the phosphorus-containing flame retardants provide flame retardant activity through a combination of condensed phase reactions, polymer carbonization promotion, and char formation. These processes obviously depend on the polymer in which such additive(s) are employed. Therefore, specific phosphorus-containing structures need to be designed for various polymers types. Phosphorus-containing flame retardants also provide flame retardant activity through a gas-phase mechanism. However, because phosphorus-containing compounds tend to react with the decomposing polymer in the course of combustion instead of merely being volatilized, high gas-phase activity of phosphorus additives is relatively rare.

In late 1970s and early 1980s various, salts, such as zirconium or zinc salts, of diaryiphosphinates, alkyl-arylphosphinates or dialkylphosphinates were prepared, as illustrated, for example, by U.S. Pat. Nos. 4,180,495; 4,208,321; and 4,208,322. These phosphinate salts were added to PET or copolymerized with the polyester. At levels of 10-20 wt. %, an improvement of flammability retardation, as measured by the oxygen index (OI) of from 1 to 4 units, was observed.

Later on, a variety of alkylphosphinic acid metal salts of zinc (M=Zn) or aluminum (M=Al), as described by formulae I to IV shown below, were tested in PBT (see European Patent Publication No. 794,220). It was found that the aluminum salt of ethylmethylphosphinic acid (I) gave a V-0 rating in the UL-94 test at 15 wt. % loading in plain PBT and at 20 wt. % loading in glass-filled PBT. The calcium salts of dialkylphosphinic acids (M=Ca) were proven to be as efficient as the aluminum salts and provided a V-0 rating in the glass-filled PBT at 20 wt. % loading (see U.S. Pat. No. 5,780,534 and European Patent Publication No. 941,996). These phosphinic acid salts are not particularly efficient in the glass-filled nylons and provide a V-0 rating only at 30 wt. % loading.

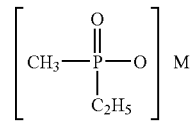
(I)

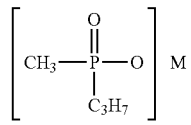
(II)

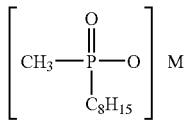
(III)

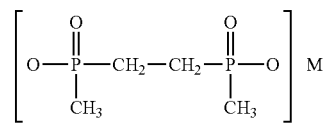
(IV)

European Patent Publication No. 794,191 discloses the use of cyclic aluminum salts of 1-hydroxydihydrophosphole oxide and 1-hydroxyphospholane oxides (see formulae V, VI and VII below) in the non-glass filled PBT and nylons. A V-0 rating in PBT was achieved at 20 wt. %.

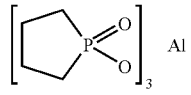
(V)

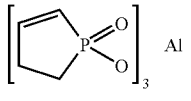
(VI)

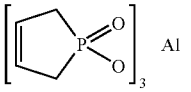
(VII)

The aluminum salts of 1-(methoxyethyl)methylphosphinic (formula VIII below), of (1-ethoxyethyl)methylphosphinic (formula IX below) and of the 1-(methoxyethyl)ethylphosphinic acids (formulae X below) were disclosed in European Patent Publication No. 971,936. These products showed only a V-1 rating at 20 wt. % loading in the glass-filled PBT.

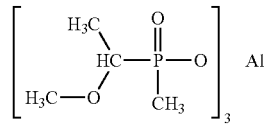
(VIII)

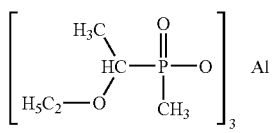
(IX)

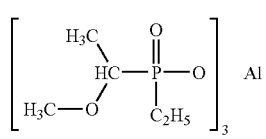
(X)

In spite of a relatively high phosphorus content, the aluminum salt of hydroxymethylmethylphosphinic acid (formula XI below) was less efficient and showed a V-2 rating in glass-filled PBT as exemplified in the U.S. Pat. No. 6,303,674.

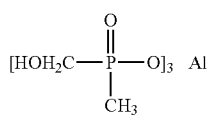
(XI)

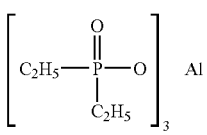
(XII)

It has also been recognized that although the aluminum salt of ethylmethylphosphinic acid (Formula I above) and the aluminum salt of diethylphosphinic acid (Formula XII above) are not particularly effective in nylons, they are synergistic with nitrogen-containing products like melamine cyanurate (see U.S. Pat. Nos. 6,255,371; 6,365,071; and 6,503,969) or melamine phosphate (see U.S. Pat. No. 6,207,736). In other words, these combinations are more effective in nylons than are the individual components.

More recently, it was discovered that the flame retardant efficiency of metal salts of alkylphosphinic acids depends, to great extent, on the volatility (tendency to evaporate or sublime) of these salts. For example, it was unexpectedly found (see Provisional U.S. Patent Application Ser. No. 60/581,832 filed Jun. 22, 2004 and PCT Application No. PCT/US05/21726 filed Jun. 20, 2005, the entire contents of which are incorporated by reference herein, that the aluminum salt of diisobutylphosphinic acid (Formula XIII below) is more efficient; especially in nylons, than, for example, the aluminum salt of diethylphosphinic acid (Formula XII above) in spite of the fact that the aluminum salt of diisobutylphosphinic acid contains less percent, by weight, of the flame retardant element, phosphorus, than does the aluminum salt of diethylphosphinic acid. In addition, although the aluminum salt of diisobutylphosphinic acid (Formula XIII) has a higher molecular weight than diethylphosphinic acid (Formula XII), the diisobutylphosphinic acid (Formula XIII) exhibits better volatility than the aluminum salt of diethylphosphinic acid (Formula XII).

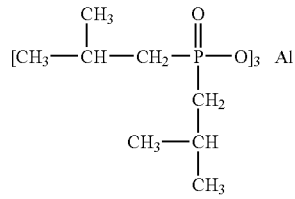
(XIII)

As mentioned above, the mechanism for flame retardant activity for phosphorus-containing flame retardants is usually the condensed phase. Phosphorus-containing flame retardants possessing the gas phase characteristic are rare since not only must the flame retardant not react with the decomposing polymer but the phosphorus-containing compound must also possess the right degree of volatility so as not to be lost during processing of the polymer compositions in which they are added (i.e., not volatilize at too low a temperature) and not volatilize at too high a temperature, so as to be inefficient during combustion. Phosphorus-containing flame retardant additives possessing these desired properties are therefore highly desirable.

BRIEF SUMMARY OF INVENTION

The present invention relates to a flame retardant thermoplastic polymer composition comprising a thermoplastic polymer and an effective flame retardant amount of a mixture of metal salts of dialkylphosphinic and monoalkylphosphinic acids. Typically, thermoplastic polymers used in the present invention are polyesters, nylons, glass-filled polyesters, glass-filled nylons, blends of polyesters with other polymers, such as polyester/polycarbonate blends, blends of nylon with other polymers, such as nylon-6,6/polyphenylene ether (PPE) blends and the like.

In accordance with the present invention, it has been surprisingly found that flame retardant compositions comprising a mixture of metal salts of disubstituted phosphinic acids of the general formula:

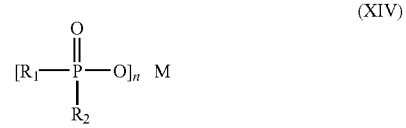
(XIV)

wherein $R_1$ and $R_2$ are the same or different linear or branched (preferably branched) $C_1$ to $C_{15}$ alkyl and n is the valence of metal M, and metal salts of monosubstituted phosphinic acids of general formula:

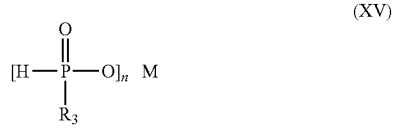
(XV)

wherein $R_3$ is linear or branched $C_1$ to $C_{15}$ alkyl and n is the valence of metal M, demonstrate better processability, higher flame retardant efficiency and improved thermal stability. In accordance with the present invention, the flame retardant mixture of phosphinic acid salts of the present invention can be derived by either directly mixing the individual salts, i.e., the dialkylphosphinate metal salt with the monoalkylphosphinate metal salt, or can be derived as a result of the synthesis of the dialkylphosphinic metal salt, whereby some monoalkylphosphinic acid salt is produced. The metal (M) is preferably multivalent and is selected from Groups II, III or IV of the Periodic Table or a transition metal.

DETAILED DESCRIPTION OF THE INVENTION

The present invention is directed to a flame retardant thermoplastic polymer composition comprising a thermoplastic polymer and an effective flame retardant amount of a mixture of metal salts of dialkylphosphinic and monoalkylphosphinic acids. The mixture of metal salts comprises (a) a metal salt of disubstituted phosphinic acid of the general formula:

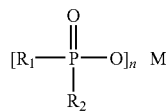

wherein $R_1$ and $R_2$ are the same or different linear or branched (preferably branched) $C_1$ to $C_{15}$ alkyl, and (b) a metal salt of monosubstituted phosphinic acid of general formula

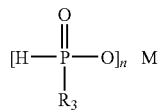

wherein $R_3$ linear or branched (preferably branched) $C_1$ to $C_{15}$ alkyl.

In one embodiment of the invention, $R_1$, $R_2$ and $R_3$ are the same or different and are $C_3$ to $C_8$ alkyl. In another embodiment of the invention, the $R_1$, $R_2$ and $R_3$ groups of the metal phosphinate salts described above are the same and are isobutyl. Representative thermoplastic polymer materials used in the compositions of the present invention include, for example, polyesters, nylons, glass-filled polyesters, glass-filled nylons and blends of these materials with other polymers, such as polyester/polycarbonate blends, and nylon-6,6/polyphenylene ether (PPE) blends and the like. The term "M" in the above-described metal salts is a multivalent metal selected from Groups II, III or IV of the Periodic Table or a transition metal. Preferably "M" is aluminum.

The flame retardant mixtures of the present invention may contain a metal salt of monoalkylphosphinic acid in the range of from about 0.5 to about 50 weight percent, preferably of from about 3 to about 30 weight percent and more preferably in the range of from about 5 to about 20 weight percent, based on the total mixture.

In another embodiment of the present invention the flame retardant thermoplastic polymer composition may contain a mixture of metal salts of mono and disubstituted phosphinic acids in an amount of from about 3 to about 30 weight percent, based on the total weight of the composition, more preferably in an amount of from about 5 to about 20 weight percent of the total weight of the composition.

The following terms as used herein are intended to have the following meanings. The term "thermoplastic polymer", used in this invention is intended to include any organic polymeric material that can be reprocessed and reshaped at the temperature above its softening or melting point. Thermoplastic polymers are usually processed by extrusion and injection molding techniques, but the processing of these materials is not limited to these two techniques. Examples of such thermoplastic polymers are polyethylene, polypropylene, polystyrene, high impact polystyrene (HIPS), ABS, thermoplastic polyesters, nylons, polycarbonate, polyphenylene ether and their blends.

The term "thermoplastic polyester", as used herein, is intended to include any polymeric thermoplastic material containing ester groups, —O—C(O)—, in the main chain. More particularly, the present invention is related, in a preferred embodiment thereof, to the two most commonly used thermoplastic polyesters: poly(butylene terephthalate) and polyethylene terephthalate).

The term "nylon", as used herein, is intended to include any polymeric thermoplastic material containing amide groups, —NH—C(O)—, in the main chain. More particularly, this invention is related, in another preferred embodiment, to the two most commonly used nylons: nylon-6 and nylon-6,6.

In many electronic and electrical applications where flame retardancy is required, thermoplastic polyesters and nylons are filled with inorganic powdered filler, such as silica, talc and the like or reinforcing fibers, such as graphite or chopped glass fiber. In a preferred embodiment, the present invention relates to glass fiber-filled thermoplastic polyesters or nylons.

As stated above and further described as follows, the phosphorus containing flame retardant additives used in accordance with the present invention are metal salts of phosphinic acids represented by formulas (XIV) and (XV), wherein $R_1$, $R_2$ and $R_3$ are same or different, linear or branched, $C_1$ to $C_{15}$ alkyl, preferably branched $C_3$ to $C_8$ alkyl, for example isobutyl, isopentyl, neopentyl, isohexyl and the like. Most preferably $R_1$ and $R_2$ are isobutyl. The metal (M) is preferably multivalent and is selected from Groups II, III or IV of the Periodic Table or a transition metal. Typical metals include aluminum, magnesium, calcium, strontium, zinc, copper, iron, zirconium and titanium. Aluminum is preferred. The value of n depends on the valence of the metal (M). Typically n is 2 to 4. Most preferred flame retardant additives in accordance with the present invention are monoisobutyl and diisobutyl butylphosphinic acid salts.

In a preferred embodiment of the present invention, upon heating, the metal salts of the present invention should mostly volatilize in order to provide a gas phase mechanism of action. Preferably, at least the metal salt of the dialkylphosphinic acid should volatilize to substantial completeness as measured by thermogravimetry in an inert atmosphere at a linear heating rate. In regard to the present invention, this volatilization begins (at the onset of weight loss, i.e., about 2% weight loss of the salt) at about 300° C. and should be substantially complete at about 500° C., more preferably at about 400° C., when measured at a heating gradient of 10° C./minute in an inert atmosphere.

In the course synthesizing the dialkylphosphinic acids of the present invention which are used for further conversion into phosphinic acid salts represented by formula (XIV), some monoalkylphosphinic acids may be produced. These acids can be either removed by the washing procedure described in PCT Patent Publication WO 05/105818 which is incorporated herein in its entirety by reference or, as preferred in the practice of the present invention, left in the reaction product which is converted to produce a flame retardant mixture comprising metal salts of both monoalkylphosphinic acid and dialkylphosphinic acid. In other words, the washing procedure described above is not performed and the crude mixture of monoalkylated and dialkylated phosphinic acids is converted to a mixture of metal salts. Also as stated above, the concentration of monoalkylphosphinic acid metal salt may be in the range of from for example 0.5 to 50 weight percent, preferably 3 to 30 weight percent and more preferably 5 to 30 weight percent, of the total weight of the mixture. To achieve these concentrations either additional monoalkylphosphinic acid can be added to the crude mixture prior to converting the mixture to a mixture of metal salts so that the resulting mixture contains the desired amount of metal salt of monoalkylphosphinic acid.

In the alternative, metal salts of either or both monoalkyl and dialkylphosphinic acids may be added to a mixture if after the monoalkyl and dialkylphosphinic acids present in the mixture have been converted to metal salts there is less than what is desired for one or both of the salts in the final mixture.

In preparing the flame-retardant thermoplastic polymer composition of the present invention, the phosphorus-containing flame retardant mixture of metal salts of dialkyl and monoalkylphosphinic acids should be present at a level from about 3% to about 30%, by weight of the total weight of the thermoplastic polymer composition. Preferred levels are from about 5% to about 20%. Further, the composition can contain one or more other functional additives that are normally employed in such systems including anti-drip agents, dispersants, toughening agents, processing aid additives, charring catalysts and the like.

The present invention is further illustrated by the following representative Examples.

Example 1

Synthesis of Diisobutyl Phosphinic Acid

A 20-liter hasteloy reactor was carefully dried with nitrogen. 2374 g (39.5 mol) of acetic acid was added to the reactor and then 2968 g (28 mol) sodium hypophosphite was added through a solids port feeder. The mixture was continuously stirred. The reactor was then heated to 70 deg. C. and 1637 g 98% $H_2SO_4$ was added at a rate of 110 g/min (59.8 ml/min) over 15 minutes. This reaction was exothermic and the temperature was controlled not to rise above 117° C. A solution of 5400 g (46.55 mol) tert-butyl acetate containing 170 g di-tertbutyl peroxide was then added over 10 hours using a metering pump. The reactor was cooled down to the temperature of 70 deg. C. and 326 g $H_2SO_4$ was added over 15 minutes. The reactor was heated to 115 deg C. A solution consisting of 1500 g (12.93 mol) tert-butyl acetate and 100 g di-tert-butyl peroxide was added over 6 hours using a metering pump. The temperature was maintained at 115-116 deg. C. for two hours and then ramped down to 106 deg. C. over the remaining four hours. The reactor was allowed to stand at 106 deg. C. for one hour.

Purification of Diisobutylphosphinic Acid.

After the reactor cooled down, the liquid in the reactor was drained out of the reactor leaving the solids in the reactor. The solids that remained in reactor were washed three times, each time using about 600-ml. acetic acid. The liquid was drained out again and the solids removed and collected. The remaining acetic acid was removed from the filtrate using a vacuum evaporator. The filtrate was transferred to a 50 gallon wash tank where it was dissolved in toluene in the amount of about 20 to 30% of the filtrate. The obtained solution was washed with water at room temperature under agitation at 300 rpm. After agitation stopped and separation of the oil and aqueous layers completed, the aqueous layer was drained out from the bottom of the wash tank.

Removal of Monoisobutylphosphinic Acid.

The concentration of acid was determined by $^{31}P$ NMR. 10% $Na_2CO_3$ solution was prepared in an amount sufficient to neutralize monoisobutylphosphinic acid. The oily fraction in the wash tank was washed with $Na_2CO_3$ solution in several portions each time separating the bottom aqueous layer from the wash tank. When removal of sodium monoisobutylphosphinate was completed, as monitored by $^{13}P$ NMR, the additional water wash was performed on the remaining diisobutylphosphinic acid. The remaining water and toluene were removed under vacuum.

Conversion into Aluminum Salt.

Three parts water were added to one part of diisobutylphosphinic acid in the wash tank. 50% sodium hydroxide solution was prepared in an amount sufficient to neutralize all of the diisobutylphosphinic acid. The sodium hydroxide solution was added to the wash tank and the pH was carefully monitored. The last portions of the 50% sodium hydroxide solution were added slowly so not to past the neutralization point. The target pH is 7.1. Water was added in the amount to make a 6 wt. % solution of sodium diisobutylphosphinate. 3 wt. % aqueous aluminum chloride solution was prepared in an amount necessary to replace sodium. The $AlCl_3$ solution was slowly added to the wash tank. Precipitated aluminum diisobutylphosphinate was filtered out with vacuum assistance and then dried at 120 deg. C. The final white powdered product contained about 99% aluminum salt of diisobutylphosphinic acid.

Example 2

Example 1 was repeated except the step removing the monoisobutylphosphinic acid was omitted. The final white powder product contains about 85% mol. (89% by weight of the total weight of the mixture) aluminum salt of diisobutylphosphinic acid and about 15% mol. (11% by weight of the total weight of the mixture) aluminum salt of monoisobutylphosphinic acid.

Comparative Examples 3 and 4

The aluminum salt of diisobutylphosphinic acid prepared in Example 1 was dry blended with a glass-filled nylon 6.6 (Celanese 1503 2P brand of Ticona) in proportions described in Table 1 below. The blend was added into a melt mixer that was preheated to 290 deg.C. The blend was processed for 5 minutes, then quickly removed from the mixer and shaped into ⅛ inch thickness slab. After cooling, the specimens for UL94 combustion test were cut from the slab. Flammability of the composites was measured according to the UL-94 protocol (vertical setup), which is described in International Plastics Flammability Handbook, J. Troitzsch Ed., $3^{nd}$ edition, Hanser Publishers, Munich, 2004 and is incorporated herein by reference.

Examples 5 and 6

Examples 3 and 4 were repeated using the mixtures of aluminum salts of diisobutylphosphinic acid and monoisobutylphosphinic acid prepared in Example 2 instead. The composition of the formulations and results of the combustion tests are shown in Table 1 below. The mixture of the salts show superior flame retardant performance because the UL-94 rating is achieved at lower loading of the flame retardant additive.

TABLE 1

|  | Comp. Ex. 3 | Comp. Ex. 4 | Ex. 5 | Ex. 6 |
|---|---|---|---|---|
| Nylon 6.6, wt. % | 90 | 90 | 90 | 90 |
| Al salt,. Ex. 1, wt. % | 10 | 5 |  |  |
| Al. salt Ex. 2, wt. % |  |  | 10 | 5 |
| UL 94 rating | V-0 | V-1 | V-0 | V-0 |

Comparative Example 7

The aluminum salt of diisobutylphosphinic acid prepared in Example 1 was formulated with a glass-fiber filled PBT (VALOX 420 brand from General Electric) by extrusion of the resin using a twin-screw extruder. The extruded resin formulation was quenched under water and was pelletized. After drying the composition was injection molded in order to prepare standard specimens of ⅛ and 1/16 inch thickness for UL 94 test as well as standard specimens for physical testing. Flammability of the molded specimens was measured according to the UL-94 protocol (vertical setup), which is described in International Plastics Flammability Handbook, J. Troitzsch ed., 3$^{nd}$ edition, Hanser Publishers, Munich, 2004. Tensile strength of the molded specimens was measured according to D638 ASTM standard, Izod impact strength according to D256 ASTM standard and heat distortion temperature (HDT) at a thickness of ⅛ inch and force of 264 psi according to D648 ASTM standard. Results of the tests are listed in the Table 2 below.

Example 8

Example 7 was repeated using the mixture of aluminum salts of diisobutylphosphinic acid and monoisobutylphosphinic acid prepared in Example 2 instead of the aluminum salt used in Example 7. Results of the tests are listed in the Table 2 below.

Comparative Example 9

Example 7 was repeated using glass-filled nylon 6 (Ultramid B3EG6 brand from BASF) instead of polybutylene terephthalate.

Example 10

Example 7 was repeated using glass-filled nylon 6 (Ultramid B3EG6 brand from BASF) instead of polybutylene terephthalate. A mixture of aluminum salts of diisobutylphosphinic acid and momoisobutylphosphinic acid as prepared in Example 2 was used instead of the aluminum salt used in Example 7.

Comparative Example 11

Example 7 was repeated using glass-filled nylon 6.6 (Celanese 1503 2P brand of Ticona) instead of polybutylene terephthalate.

Example 12

Example 7 was repeated using glass-filled nylon 6 (Celanese 1503 2P brand of Ticona) instead of polybutylene terephthalate. The mixture of aluminum salts of diisobutylphosphinic acid and monoisobutylphosphinic acid as prepared in Example 2 was used instead of the aluminum salt used in Example 7.

TABLE 2

|  | Comp. Ex. 7 | Ex. 8 | Comp. Ex. 9 | Ex. 10 | Comp. Ex. 11 | Ex. 12 |
|---|---|---|---|---|---|---|
| PBT, wt. % | 85 | 85 |  |  |  |  |
| Nylon 6, wt. % |  |  | 87.5 | 87.5 |  |  |
| Nylon 66, wt. % |  |  |  |  | 90 | 90 |
| Al salt Ex. 1 Wt. % | 15 |  | 12.5 |  | 10 |  |
| Al salt Ex. 2, wt. % |  | 15 |  | 12.5 |  | 10 |
| Processing* | ++ | ++ | ++ | +++ | + | +++ |
| UL-94 at ⅛ | V-0 | V-0 | V-0 | V-0 | V-0 | V-0 |
| Flaming time | 1.2 | 1.4 | 0.4 | 0.2 | 0.2 | 0.8 |
| UL-94 at 1/16 | V-2 | V-2 | V-0 | V-0 | V-0 | V-0 |
| Flaming time |  |  | 1.3 | 0.2 | 2.5 | 2.1 |
| Tensile strength, psi | 6400 | 4300 | 13000 | 13700 | 17800 | 17600 |
| Elongation at break, % | 2.2 | 1.8 | 5.2 | 4.8 | 5.6 | 5.6 |
| HDT, ° C. | 144 | 136 | 193 | 196 | 238 | 237 |
| Izod, ft lb/in | 0.7 | 0.6 | 1.7 | 0.9 | 1.5 | 1.3 |

*Processing (+++) - excellent; (++) - good; (+) - satisfactory

While the present invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. A flame retardant thermoplastic polymer composition comprising a thermoplastic polymer and an effective flame retardant amount of a mixture of metal salts comprising (a) at least one metal salt of a disubstituted phosphinic acid of the general formula:

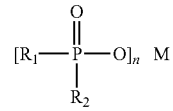

wherein $R_1$ and $R_2$ are the same or different linear or branched $C_1$ to $C_{15}$ alkyl, and (b) at least one metal salt of a monosubstituted phosphinic acid of general formula

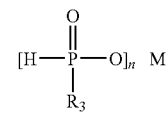

wherein $R_3$ is linear or branched $C_1$ to $C_{15}$ alkyl, and n is a valence of the metal M, and wherein the concentration of the metal salt of monoalkylphosphinic acid is in the range of from about 0.5 to about 50 weight percent of the total weight of the mixture.

2. The composition of claim 1 wherein the thermoplastic polymer is a polyester.

3. The composition of claim 1 wherein the thermoplastic polymer is nylon.

4. The composition of claim 2 wherein the polyester is glass-filled polyester.

5. The composition of claim 2 wherein the polyester is selected from the group consisting of poly(butylene terephthalate) and poly(ethylene terephthalate).

6. The composition of claim 3 wherein the nylon is glass-filled nylon.

7. The composition of claim 1 wherein the thermoplastic polymer is a blend of polymers.

8. The composition of claim 7 wherein the blend of polymers is selected from the group consisting of a polyester/polycarbonate blend and a nylon/polyphenylene ether blend.

9. The composition of claim 1 wherein M is a multivalent metal selected from Groups II, III or IV of the Periodic Table or a transition metal.

10. The composition of claim 1 wherein M is aluminum.

11. The composition of claim 1 wherein the concentration of said at least one metal salt of a monosubstituted phosphinic acid is in the range of from about 3 to about 30 weight percent of the total weight of the mixture.

12. The composition of claim 1 wherein at least the at least one metal salt of the disubstituted phosphinic acid begins to volatilize at about 300° C. and substantially ceases volatilization at about 500° C.

13. The composition of claim 1 wherein the metal salts begin to volatilize at about 300° C. and substantially cease volatilization at about 400° C.

14. A flame retardant thermoplastic polymer composition comprising a thermoplastic polymer and an effective flame retardant amount of a mixture of metal salts comprising (a) at least one metal salt of a disubstituted phosphinic acid of the general formula:

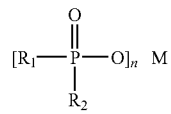

and (b) at least one metal salt of a monosubstituted phosphinic acid of general formula

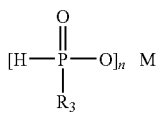

wherein $R_1$, $R_2$ and $R_3$ are isobutyl, and n is a valence of the metal M.

15. A flame retardant thermoplastic polymer composition comprising a thermoplastic polymer and an effective flame retardant amount of a mixture of metal salts comprising a metal salt of a dialkylphosphinic acid and a metal salt of a monoalkylphosphinic acid, wherein said mixture of metal salts is present in an amount of from about 3 to about 30 weight percent based on the total weight of the thermoplastic polymer composition.

16. The composition of claim 15 wherein the mixture is present in an amount of from about 5 to about 20 weight percent of the total weight of the thermoplastic polymer composition.

17. A flame retardant thermoplastic polymer composition comprising a thermoplastic polymer and an effective flame retardant amount of a mixture of metal salts comprising an aluminum salt of monoisobutylphosphinic acid and an aluminum salt of diisobutylphosphinic acid.

18. A flame retardant composition comprising a mixture of an aluminum salt of monoisobutylphosphinic acid and an aluminum salt of diisobutylphosphinic acid.

* * * * *